(12) United States Patent
Bengtsson

(10) Patent No.: US 6,761,332 B1
(45) Date of Patent: Jul. 13, 2004

(54) MULTI-FUNCTIONAL GALLEY SYSTEM

(75) Inventor: Robert J. Bengtsson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/404,856

(22) Filed: Apr. 1, 2003

(51) Int. Cl.[7] .............................................. B64D 11/04
(52) U.S. Cl. ................................ 244/118.5; 244/118.1; 244/117 R; 244/119; 244/118.6
(58) Field of Search ......................... 246/118.1–118.6, 246/117 R, 119; 312/315, 310; 105/327; 62/237

(56) References Cited

U.S. PATENT DOCUMENTS

| | | | | |
|---|---|---|---|---|
| 4,361,014 A | * | 11/1982 | Blain ........................... | 62/237 |
| RE32,176 E | * | 6/1986 | Vernon ...................... | 244/118.5 |
| 5,322,244 A | * | 6/1994 | Dallmann et al. ........ | 244/118.5 |
| 5,474,260 A | * | 12/1995 | Schwertfeger et al. ... | 244/118.5 |
| 5,491,979 A | * | 2/1996 | Kull et al. .................... | 62/237 |
| 5,496,000 A | * | 3/1996 | Mueller ..................... | 244/118.5 |
| 6,464,169 B1 | * | 10/2002 | Johnson et al. ........... | 244/118.5 |
| 2001/0050519 A1 | * | 12/2001 | Kasuya ....................... | 312/315 |

OTHER PUBLICATIONS

Photograph of Boeing 727 1 page AC–GP–01.*

* cited by examiner

Primary Examiner—Galen Barefoot
(74) Attorney, Agent, or Firm—Harness Dickey & Pierce P.L.C.

(57) ABSTRACT

A galley system including a first structure, a second structure, and a crew aisle between the first structure and the second structure. The galley system additionally includes a set of doors associated with the first structure and the second structure for concealing the crew aisle from the view of boarding passengers when the doors are in a closed position.

52 Claims, 5 Drawing Sheets

MULTI-FUNCTIONAL GALLEY SYSTEM

FIELD OF INVENTION

The invention relates generally to providing food services to passengers of an aircraft. More specifically, the invention relates to a multi-functional, dual galley system configured to provide both self-service and full-service food provisioning to passenger on-board the aircraft.

BACKGROUND OF THE INVENTION

Airlines often offer in-flight food services to traveling passengers. Typically, these services are provided by an airline attendant delivering food items, i.e. meals, snacks, and/or beverages, to the passengers while the passengers remain in their seats. Generally, the attendant utilizes a food and beverage cart to transport the food items along passenger aisles. The attendant the hands the food items to each passenger as the attendant progresses along the aisle. The passenger aisles are located between the seats of the aircraft and are used for the passenger and attendants to move throughout the aircraft. In most cases, when the attendants are performing the food services duties, the food and beverage carts block the aisle, making it very cumbersome for passengers and other attendants to move about the aircraft. Thus, delivering the food item to the passengers at their seats is time consuming, cumbersome, labor intensive, limits mobility of the passengers during performance of the services, thereby generally relegates the passengers to their seats during flight.

Typically, an aircraft includes at least one galley used to store food items, prepare meals, store the snack and beverage carts, and stock the snack and beverage carts in preparation for delivery of the food items to the passengers. Galleys typically include a staging area, a plurality of food item storage compartments, and storage bins for the food and beverage carts. The staging area is usually an aisle or area located between two structures comprising the storage compartments and bins. These galleys are often located near a door of the aircraft through which the passengers board and disembark. Thus, as passengers board the aircraft they can see directly into the galley staging area. The galleys typically include a curtain to close off the staging area, but these curtains are often left open and are not generally a good obstruction to the view of passengers as they board the aircraft or move about the aircraft during flight. Additionally, the curtains do not provide a good sound barrier to noise from within the galley, and are not very aesthetically pleasant looking.

BRIEF SUMMARY OF THE INVENTION

In one preferred embodiment of the present invention, a galley system is provided. The galley system includes a first structure, a second structure. and a crew aisle between the first structure and the second structure. Additionally, the galley system includes a set of doors associated with the first structure and the second structure. The doors conceal the crew aisle from the view of boarding passengers when the doors are in a closed position.

In another preferred embodiment of the present invention, a method is provided for serving food items to passengers of an aircraft utilizing a multi-functional galley system. The method includes providing a first group of passengers self-service access to food items stored, secured and displayed in a self-service food structure included in the multi-functional galley system. The method additionally includes serving a second group of passengers food items utilizing serving carts that are parked in a serving cart and supply storage structure included in the multi-functional galley system when the serving carts are not in use.

In yet another preferred embodiment of the present invention, an aircraft multi-functional galley system is provided. The multi-functional galley system includes a passenger self-service food structure including a plurality of food display compartments extending through the self-service food structure. The food display compartments are used to store, secure and display food items that are accessible by passengers. Additionally, the aircraft galley system includes a serving cart and supply storage structure including a plurality of serving cart parking bins and a plurality of storage compartments. The serving cart parking bins are used to store and secure serving carts used by a crew member to serve food items to the passengers and the storage compartments are used to store and secure food items. Furthermore, the aircraft galley system includes a crew aisle between the passenger self-service food structure and the serving cart and supply storage structure.

BRIEF DESCRIPTION OF THE DRAWINGS

The present invention will become more fully understood from the detailed description and accompanying drawings, wherein.

DETAILED DESCRIPTION OF THE INVENTION

Figure 1:
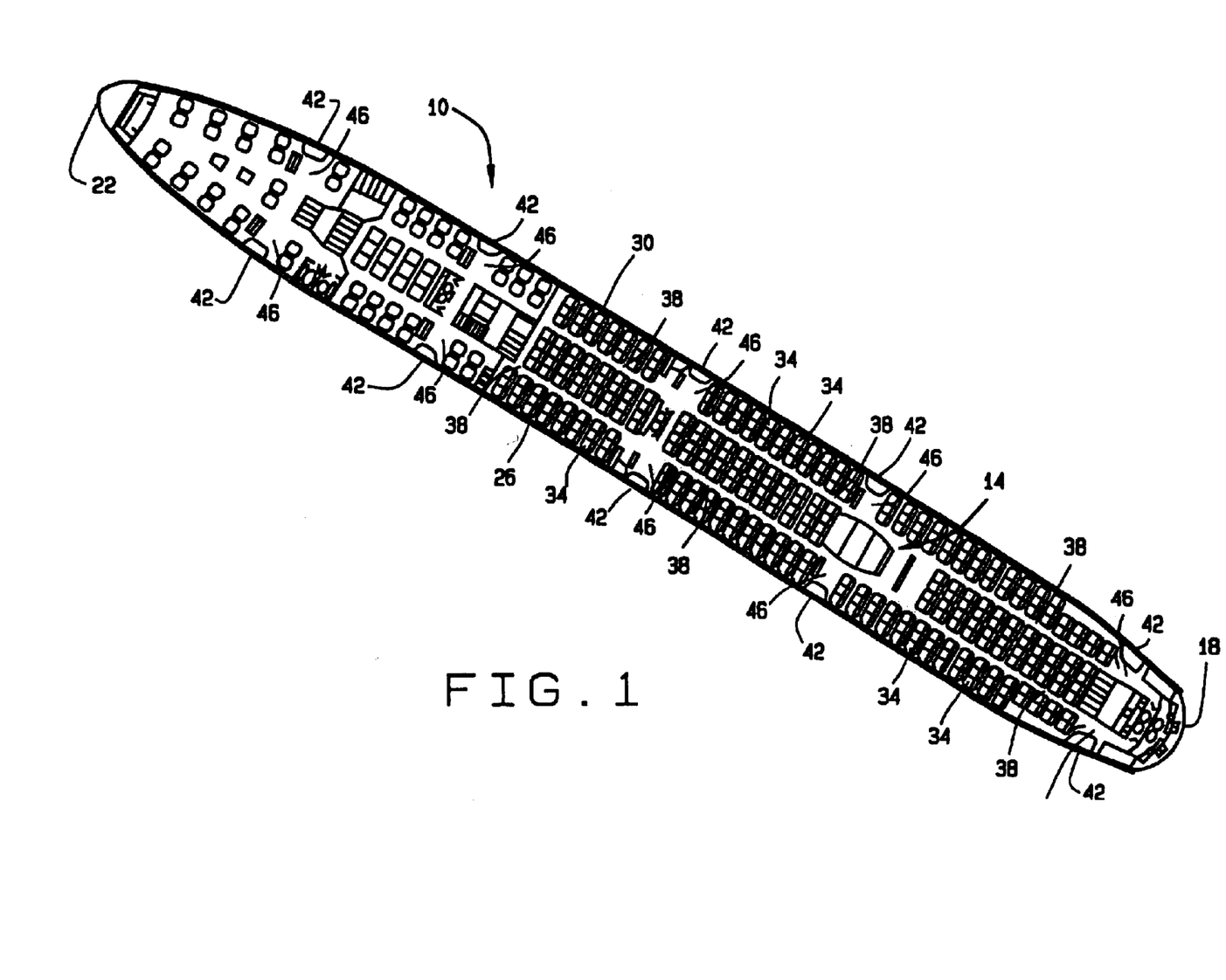
FIG. 1 is a sectional view of an exemplary aircraft passenger cabin including a multi-functional galley system, in accordance with a preferred embodiment of the present invention.

FIG. 1 is a sectional view of an exemplary aircraft passenger cabin 10 including a multi-functional galley system 14, in accordance with a preferred embodiment of the present invention. The aircraft passenger cabin 10 has an aft end 18, a fore end 22, a port side 26 and a starboard side 30. Additionally, the passenger cabin 10 includes a plurality of passenger seats 34 that are grouped and spaced such that passenger aisles 38 are formed between certain groups of seats 34. Furthermore, the passenger cabin includes a plurality of hatches 42. At least one of the hatches 42 is used for boarding and disembarking of the passengers. Each hatch 42 is adjacent a hatchway 46 that joins one of the passenger aisles 38. It is envisioned that the multi-functional galley system 14 is located adjacent one of the hatches and hatchways 42 and 46. However, the multi-functional galley system 14 can be located anywhere within the passenger cabin 10 and remain within the scope of the invention.

Figure 2:
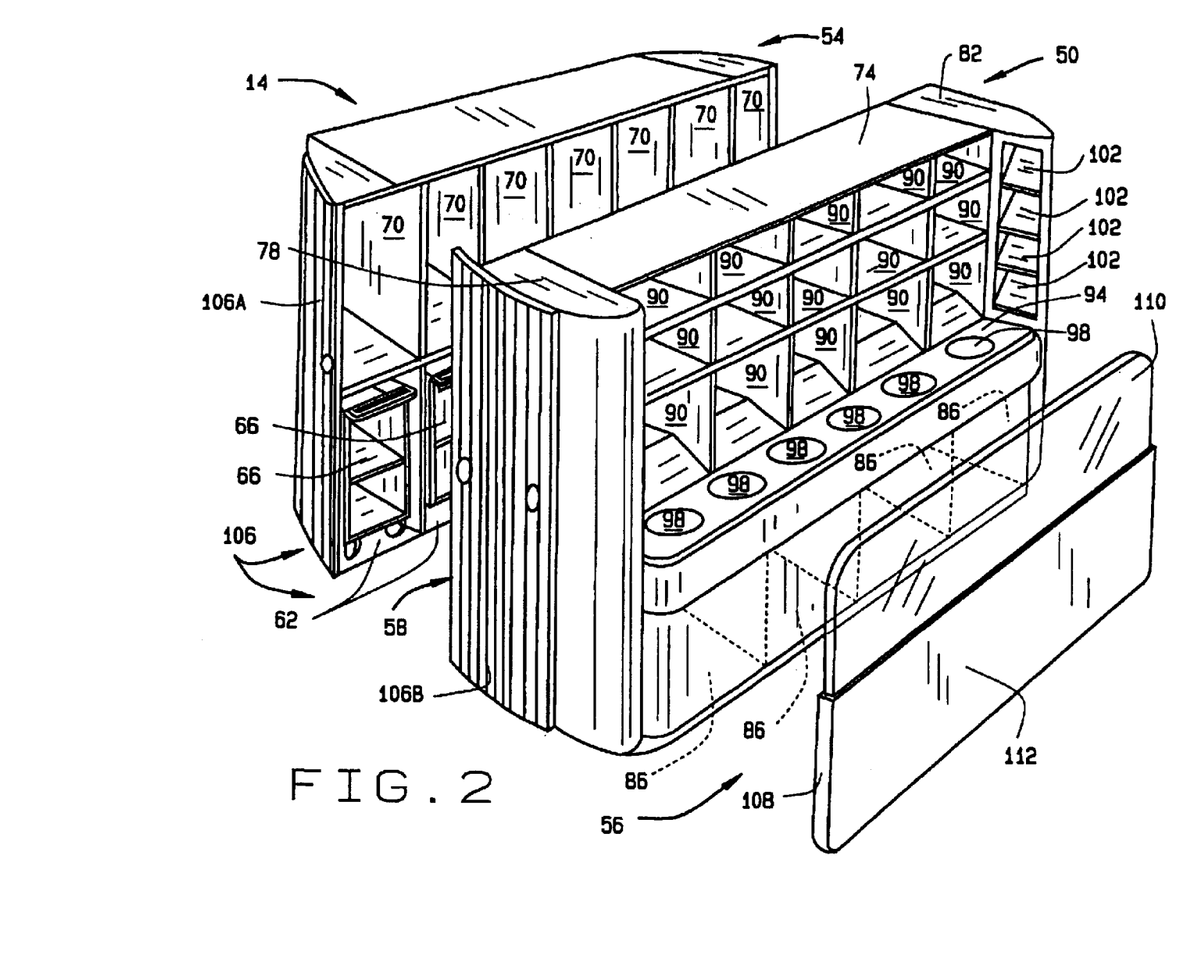
FIG. 2 is a perspective view of the multi-functional galley system, shown in FIG. 1, in accordance with one preferred embodiment of the present invention.

FIG. 2 is a perspective view of the multi-functional galley system 14 (shown in FIG. 1), in accordance with one preferred embodiment of the present invention. The multifunctional galley system 14 includes a passenger self-service food structure 50, herein referred to as the self-service structure 50, a serving cart and supply storage structure 54, herein referred to as the cart and supply structure 54, and a passenger cross aisle 56. The self-service structure 50 is positioned aft of the cart and supply structure 54, such that the self-service structure 50 faces the aft end 18 of the aircraft and the cart and supply structure 54 faces the fore end 22 of the aircraft. The passenger cross aisle 54 is located aft of the self-service structure 50. The self-service structure 50 and the cart and supply structure 54 are spaced apart, thereby forming a crew aisle 58 therebetween, sometimes referred to as a staging area.

The cart and supply structure 54 includes a plurality of serving cart parking bins 62 used to store and secure a plurality of serving carts 66 when the serving carts 66 are not in use. Each cart parking bin 62 is adapted to store at least one serving cart 66 such that the serving cart 66 will be securely retained in the parking bin 62 during flight. Thus, when stored in the parking bins 62, the serving carts 66 will not be able to freely move about the aircraft due to in-flight turbulence or aircraft movement. The cart and supply structure 54 additionally includes a plurality of storage compartments 70 for storing and securing food items. As used herein, the term 'food items' means any type of food product, beverage, condiment, or any other such items typically found a public cafeteria or restaurant. For example, food items include, pre-packaged meals or sandwiches, on-site prepared meals or sandwiches, pastries, fruit, vegetables, salads, desserts, prepackaged snacks, canned or bottle beverages, fountain beverages, and candies. The storage compartments 70 are adapted to store and secure food items such that the food items are not displaced or disrupted by in-flight turbulence or aircraft movement. It is envisioned that the food items will be placed in storage containers or trays (not shown) and then stored and secured in the storage compartments 70. The containers can be secured in the storage compartments 70 by any suitable retaining means, such as a latch, a clip, or loop and hook fabric fasteners, i.e. Velcro®. Thereafter, the containers can be removed from the storage compartments 70 by a crew member standing in the crew aisle 58, the food items can then be removed from the containers and the containers returned to the storage compartments 70.

Figure 3:
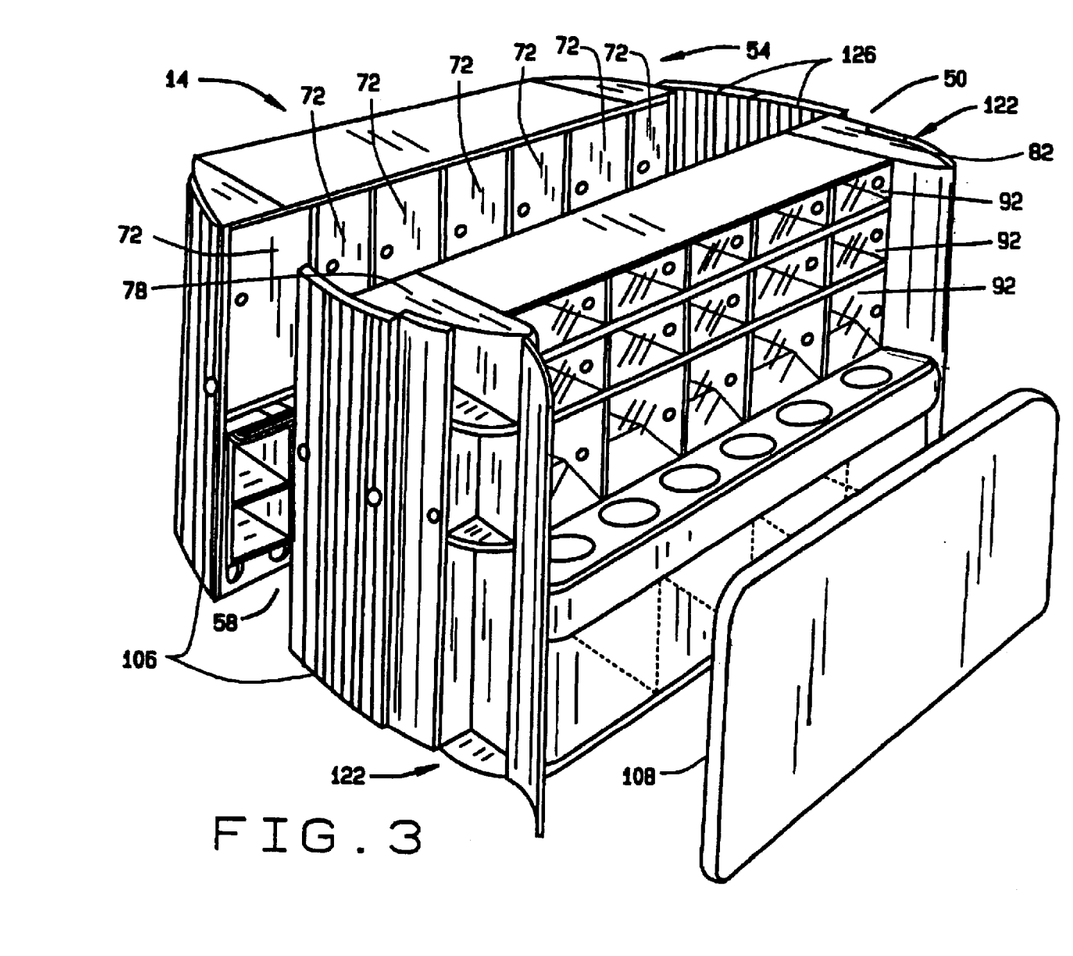
FIG. 3 is perspective view of the multi-functional galley system, shown in FIG. 2, illustrating other preferred embodiments of the present invention.

In an alternative preferred embodiment, each storage compartment 70 includes a latching door 72, as shown in FIG. 3. Therefore, the containers, or individual food items, can be placed in the storage compartments 70 and prevented from being displaced or disrupted in-flight by closing and latching the doors 72. In another preferred embodiment, each of the storage compartments 70 are heated, refrigerated or maintained at an ambient temperature. Therefore, some desired food items can be warmed or heated in particular storage compartments 70, while other desired food items can be cooled or frozen in other particular storage compartments 70, while still other desired food items can be maintained at an ambient temperature in still other particular storage compartments 70.

The self-service structure 50 includes a center section 74, a first end section 78 coupled to one end of the center section 74, and a second end section 82 coupled to an opposing end of the center section 74. The center section 74 includes a plurality of storage compartments 86 for storing and securing food items. The storage compartments 86 are essentially the same in purpose and function as the storage compartments 70, included in the cart and supply structure 54. Thus, the storage compartments 86 are adapted to store and secure food items such that the food items are not displaced or disrupted by in-flight turbulence or aircraft movement. As described above in reference to storage compartments 70, food items can be placed in storage containers or trays and then stored and secured in the storage compartments 86, or food items can be stored individually In the storage compartments 86 and secured by a latching door. Thereafter, the food items can be accessed by a crew member standing in the crew aisle 58. In an alternate preferred embodiment, each of the storage compartments 86 are heated, refrigerated or maintained at an ambient temperature. Therefore, food items can be warmed, heated, cooled, frozen, or maintained at an ambient temperature by placing them in the appropriate storage compartment 86.

The center section 74 additionally includes a plurality of food display compartments 90 used for storing, securing and displaying food items that are accessible by passengers as the passengers traverse the cross aisle 56. Each food display compartment 90 extends through the center section 74 so that a crew member can place food items in the food display compartments 90 from the crew aisle 58, and a passenger can retrieve a selected food item from any of the food display compartments 90 from the cross aisle 56. It is envisioned that a bottom of each food display compartment 90 can be flat or slanted to provide a desired view of the food items and a desired accessibility to the food items. In one preferred embodiment, each food display compartment 90 is adapted to hold and secure food containers that hold a plurality of food items, such that when a food container is empty or nearly empty the food container can be removed by a crew member from the crew aisle 58 and replaced with another food container filled with food items. In another preferred embodiment, each food display compartment 90 is adapted to hold and secure a plurality of individual food items, such that when food items are selected by a passenger from the front of a food display compartment 90, i.e. the aft side of the food display compartment 90, other food items will slide forward or be moved forward by a crew member in the crew aisle 58.

In still another preferred embodiment, each food display compartment 90 can include a back door (not shown) on the back side, i.e. fore side, of the food display compartment 90 that prevents food items from being displaced from the food display compartment 90 during turbulence or movement of the aircraft. Each of the back side doors can be opaque such that a passenger standing in the cross aisle 56 can not see through the food display compartments 90 into the crew aisle 58, or translucent such that a crew member can readily see when a food display compartment 90 needs to be replenished with food items. In yet another preferred embodiment, each food display compartment 90 also includes a translucent front door 92 on the aft side, as shown in FIG. 3. The front doors 92 also prevent food items from being displaced from the food display compartments 90 due to turbulence or movement of the aircraft.

In another preferred embodiment, each of the food display compartments 90 are heated, refrigerated or maintained at an ambient temperature. Therefore, some desired food items can be warmed or heated in particular food display compartments 90, while other desired food items can be cooled or frozen in other particular food display compartments 90, while still other desired food items can be maintained at an ambient temperature in still other particular food display compartments 90.

The center section 74 further includes a counter 94 located below the food display compartments 90 on the front side, i.e. aft side, of the center section 74. The counter 94 includes at least one food bin 98 for storing, securing and displaying food items accessible by passengers as the passengers traverse the cross aisle 56. In one preferred embodiment, the food bin 98 can be heated, refrigerated or maintained at an ambient temperature such that food items can be warmed, heated, cooled, frozen, or maintained at an ambient temperature by placing them in the food bin 98.

In another preferred embodiment, one of, or both, the first and second end sections 78 and 82 includes at least one food display alcove 102 for storing, securing and displaying food items accessible to passengers as they traverse the cross aisle 56. In one preferred embodiment, the food display alcove 102 can be heated, refrigerated or maintained at an ambient temperature such that food items can be warmed, heated, cooled, frozen, or maintained at an ambient temperature by placing them in the food alcove 102.

In yet another preferred embodiment, the multi-functional galley system 14 includes a first set of doors 106 associated with both the cart and supply structure 54 and the self-service structure 50. The first set of doors 106 includes a first door 106A connected to the cart and supply structure 54, and a second door 106B connected to the self-service structure 50. In one preferred embodiment, the first set of doors 106 are sliding doors wherein the first door 106A is adapted to slide along an exterior of a port side end of the cart and supply structure 54 and the second door 106B is adapted to slide along an exterior of the first section 78 of the self-service structure 50. When the first set of doors 106 are in an 'Open' position, as shown in FIG. 2, the crew aisle 58 is accessible by crew members and visible to passengers boarding the aircraft, via an adjacent hatch 42 (shown in FIG. 1), or moving along an adjacent passenger aisle 38. When the first set of doors 106 are in a 'Closed' position, the crew aisle is inaccessible by crew members and blocked from the view of boarding passengers or passengers moving along an adjacent passenger aisle 38. In one preferred embodiment, the first set of doors 106 are sliding doors such that when in an 'Open' position, the first door 106A slides or retracts along the exterior of the port side end of the cart and supply structure 54 and the second door 106B slides or retracts along the exterior of the first section 78 of the self-service structure 50.

Alternatively, the first set of doors 106 can be any type of doors suitable to block access and view of the crew aisle 58 when in the closed position. For example, the first and second doors 106A and 106B can be single panel doors hingedly coupled to cart and supply structure 54 and the self-service structure 50, or the first and second doors 106A and 106B can be folding multi-panel doors hingedly coupled to cart and supply structure 54 and the self-service structure 50.

It is envisioned that an exterior side of the first set of doors 106, i.e. the side opposite the crew aisle 58, could be finished, covered, or decorated in any desirable manner. For example, the first set of doors 106 could be wood doors with a stained finish, or metal doors with a padded fabric covering, or composite doors with decorative posters displayed on the exterior sides. In one preferred embodiment, the first set of doors 106 are constructed of a sound absorbing material such that when the doors 106 are in the closed position, noise from the crew aisle 58 is substantially baffled and not audible to passenger in the passenger cabin 10.

The multi-functional galley system 14 further includes at least one partition 108 located adjacent the aft side of self-service structure 50 such that the cross aisle 56 is between the partition 108 and the self-service structure 50. The partition 108 separates the cross aisle 56 from the passenger seats 34 and surrounding area, thereby providing a physical barrier between passengers traversing the cross aisle 56 to select food Items from the self-service structure 50 and seated passengers. In one preferred embodiment, the partition 108 includes a translucent top portion 110 and an opaque bottom portion 112. Therefore, although the partition 108 provides a physical barrier between seated passengers and the self-service structure 50, the partition 108 does not create a sight barrier for passengers wishing to view the self-service structure 50 or other areas of the passenger cabin 10.

Although the multi-functional galley system 14 has been described above with the self-service structure 50 located nearer the aft end 18 of the passenger cabin 10, it should be appreciated that the self-service structure 50 could be located forward of the cart and supply structure 54, and the cart and supply structure 54 could be located aft of the self-service structure 50 without altering the scope of the invention. Additionally, although the multi-functional galley system 14 has been described above with the crew aisle 58 extending across the passenger cabin 10 between the port side 26 and the starboard side 30, it should be appreciated that the multi-functional galley system 14 could be oriented such that crew aisle 58 runs longitudinally along the passenger cabin 10, i.e. the crew aisle 58 extends along the passenger cabin 10 in a fore to aft direction.

FIG. 3 is perspective view of the multi-functional galley system 14 (shown in FIG. 2) illustrating other preferred embodiments of the present invention. In one preferred embodiment at least one of the first end section 78 and the second end section 82 include a supply cabinet 122. The supply cabinet 122 is accessible by a crew member from the exterior side of appropriate first or second end section 78 and 82, and used to store and secure cabin supplies such at pillows, blankets, paper products, plastic utensils, and instruction manuals. In another preferred embodiment, the partition 108 is a one piece opaque structure that at least partially blocks a view of the self-service structure 50 from passengers on the aft side of the partition 108. In yet another preferred embodiment, the multi-functional galley system 14 includes a second set of doors 126 associated with both the cart and supply structure 54 and the self-service structure 60. The doors 126 are connected to the cart and supply structure 154 and the self-service structure 150 at the opposite end of the crew aisle 58 from the first set of doors 106. The second set of doors 126 are identical in form and function as the first set of doors 106, described above.

Figure 4:
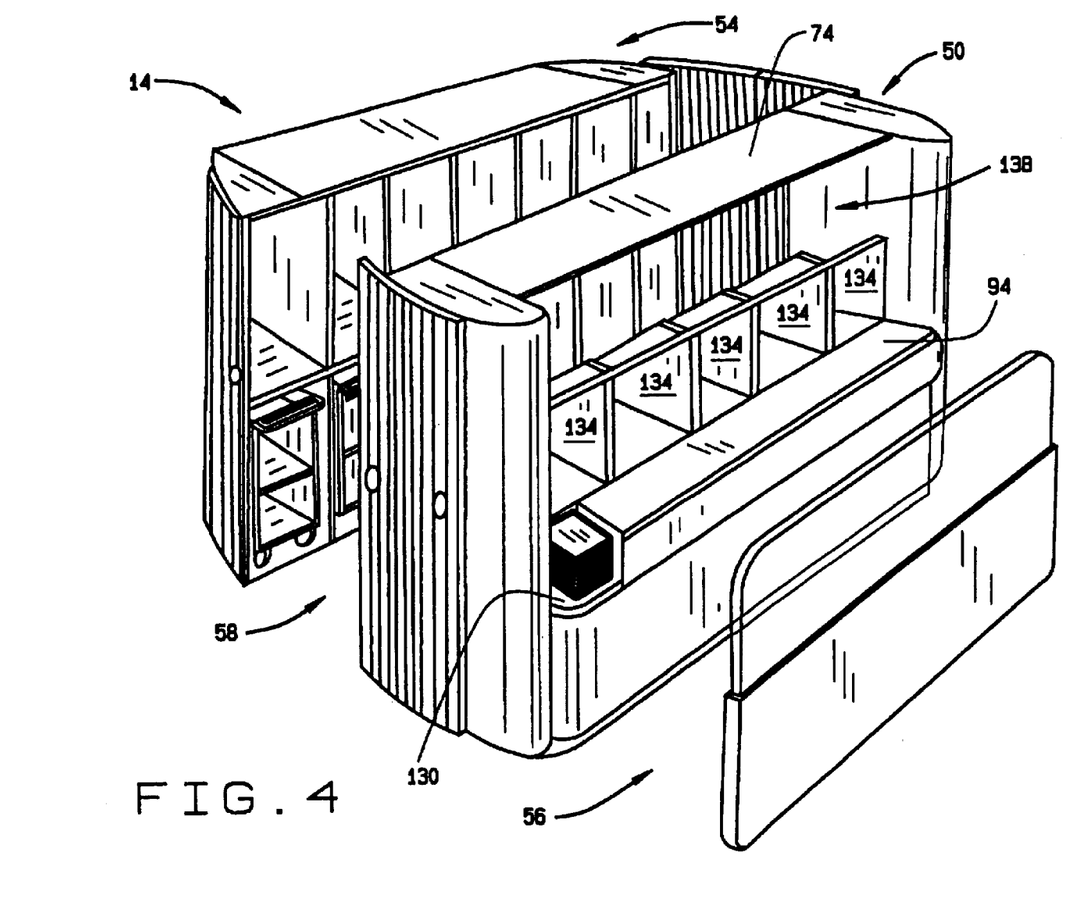
FIG. 4 is perspective view of the multi-functional galley system, shown in FIG. 2, illustrating further preferred embodiments of the present invention.

FIG. 4 is perspective view of the multi-functional galley system 14 (shown in FIG. 2) illustrating further preferred embodiments of the present invention. In one preferred embodiment, the center section includes a tray storage bin 130 for storing and securing food trays used to carry food items selected by passengers from the self-service structure 50. In another preferred embodiment, the counter 94 has an essentially smooth surface where passengers can set a food item or a food tray holding food items. In still another preferred embodiment, the food display compartments 90 are replaced by a plurality of serving bays 134. The serving bays 134 are used to store and secure food items served by a crew member. Thus, as a passenger traverses the cross aisle 56, the passenger can request a desired food item from the crew member standing the crew aisle 58. The crew member can then hand the selected food item to the passenger over the top of the food bays 134, via an open area 138 above the food bays 134. Alternatively, the food bays 134 may hold containers of prepared food items such as hamburgers, soups, pastas, and cooked vegetable that are portioned onto a plate or into a bowl and served to the passenger through the open area 138. Therefore, each food bay 134 can be heated, refrigerated or maintained at an ambient temperature such that the prepared food items can be warmed, heated, cooled, frozen, or maintained at an ambient temperature.

Figure 5:
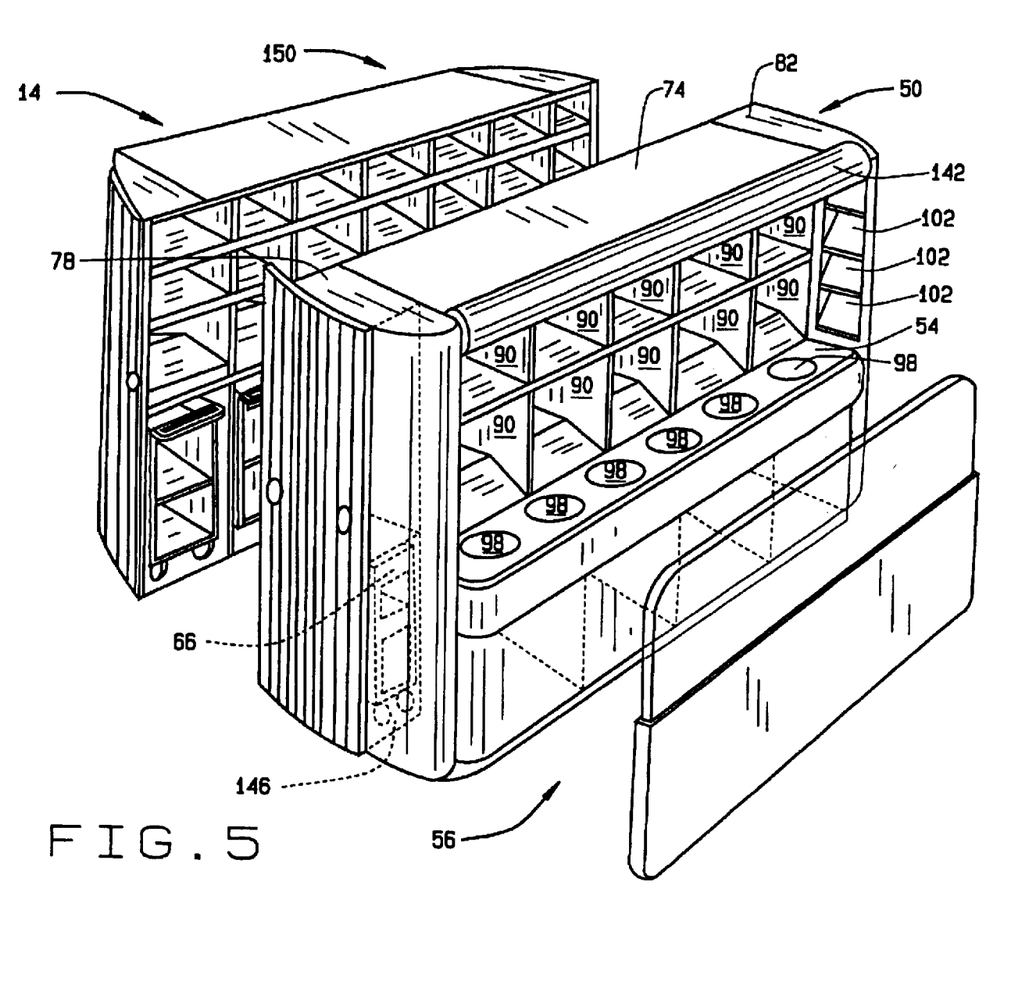
FIG. 5 is perspective view of the multi-functional galley system, shown in FIG. 2, illustrating still other preferred embodiments of the present invention.

FIG. 5 is perspective view of the multi-functional galley system 14 (shown in FIG. 2) illustrating still further preferred embodiments of the present invention. In one preferred embodiment, the self-service structure 50 includes a window cover device 142. When placed in a 'Closed' position, the window cover device 142 is used to conceal the food display compartments 90 and the counter 94 from the view of passengers. For example, it may be desirable for close the window cover device 142 while crew members are stocking the multi-functional galley system 14 with supplies and food items, when crew members are cleaning the multi-functional galley system 14, or when the self-service structure 50 is not being used to serve passengers food items. The window cover device 142 can be any device suitable to cover the food display compartments 90 and the counter 94. For example, the window cover device 142 could be a pull down rolling shade or door, as shown in FIG. 5, an upright rolling shade or door that is pulled across the front side, i.e. aft side, of the self-service structure 50, a curtain pulled across the front side of the self-service structure 50, or a set of folding multi-panel doors, wherein one door is pulled from each end section 78 and 82 to meet in the middle of the center section 74.

In another preferred embodiment of the multi-functional galley system 14, at least one of the first and second end sections 78 and 82 includes at least one serving cart parking bin 146 used to store and secure at least one serving cart 66 when the serving cart 66 is not in use. The cart parking bin 146 is adapted to store the serving cart 66 such that the serving cart 66 will be securely retained in the parking bin 146 during flight. Thus, when stored in the parking bins 146, the serving cart 66 will not be able to freely move about the aircraft due to in-flight turbulence or aircraft movement. In one preferred, embodiment, one or more serving carts 66 can be removed from parking bins 146 or 62 (shown in FIG. 2) and parked across the cross aisle 56 such that the cross aisle 56 is blocked off. Passengers will proceed to the serving cart 66, via the passenger aisles 38, and request one or more food items from a crew member located in the cross aisle 56 behind the serving cart 66. The crew member then retrieves the requested food item(s) from at least one of the food display compartments 90, the food display alcoves 102, and the food bins 98, and serves the requested food item(s) to the passenger.

In yet another preferred embodiment of the multi-functional galley system 14, the cart and supply structure 54 (shown in FIG. 2) is replaced with a second self-service structure 150. Thus, passengers can access food item from the fore and the aft side of the multi-functional galley system 14. The second self-service structure 146 is substantially identical in purpose, form and function as the self-service structure 50, described in detail above.

While the invention has been described in terms of various specific embodiments, those skilled in the art will recognize that the invention can be practiced with modification within the spirit and scope of the claims.

What is claimed is:

1. A galley system for use on a mobile platform carrying a plurality of passengers comprising:
    a first structure including a plurality of food display compartments that extend through the first structure such that the food display compartments are accessible from opposing sides of the first structure;
    a second structure including a plurality of storage compartments;
    a first aisle formed between the first structure and the second structure, the first aisle adapted to be traversed by crew members of the mobile platform;
    a second aisle formed on an opposite side of the first structure from the first aisle, the second aisle adapted to be traversed by passengers of the mobile platform as the passengers select and remove food items from the food display compartments: and
    a first set of doors associated with the first structure and the second structure for concealing the first aisle from a view of passengers boarding the mobile platform when the first set of doors are in a closed position.

2. The galley system of claim 1, wherein the first structure comprises a passenger self-service food bar.

3. The galley system of claim 1, wherein the second structure comprises a serving cart and supply storage structure for storing serving carts and supplies used to serve the passengers food items.

4. The galley system of claim 1 further comprising at least one partition located on an opposite side of the second aisle from the first structure.

5. The galley system of claim 4, wherein the partition comprises an opaque material such that the partition at least partially blocks a view of the first structure from the passengers seated in the mobile platform.

6. The galley system of claim 4, wherein the partition comprises a translucent top portion and an opaque bottom portion such that a view of the first structure is visible to the passengers seated in the mobile platform.

7. The galley system of claim 1, wherein the second structure comprises a self-service food bar.

8. The galley system of claim 1, wherein the first structure includes a center section, a first end section connected to an end of the center section, and a second end section connected to an opposing end of the center section.

9. The galley system of claim 8, wherein at least one of the center section, the first end section and the second end section comprises a tray storage compartment accessible from the second aisle for storing, securing and displaying carrying trays for carrying food items.

10. The galley system of claim 8, wherein at least one of the first end section and the second end section comprise a supply cabinet for storing and securing supplies, the supply cabinet accessible by crew members from an outer side of the first structure.

11. The galley system of claim 8, wherein the center section comprises a plurality of storage compartments for storing and securing food items, the storage compartments accessible from the first aisle by crew members.

12. The galley system of claim 8, wherein the center section comprises the plurality of food display compartments for storing, securing and displaying food items accessible by the passengers as the passengers traverse the second aisle.

13. The galley system of claim 12, wherein each food display compartment extends through the center section such that each food display compartment can be accessed from the first aisle by the crew members and from the second aisle by the passengers.

14. The galley system of claim 12, wherein each food display compartment comprises one of heated, refrigerated, and ambient temperature food display compartment.

15. The galley system of claim 12, wherein the center section further comprises a counter accessible by passengers as the passengers traverse the second aisle.

16. The galley system of claim 15, wherein the counter comprises an essentially smooth top surface such that the passengers can set food items or a food tray holding food items on the counter.

17. The galley system of claim 15, wherein the counter comprises at least one food bin for storing, securing and displaying food items accessible by passengers as the passengers traverse the second aisle.

18. The galley system of claim 17, wherein the food bin comprises one of heated, refrigerated, and ambient temperature food bin.

19. The galley system of claim 18, wherein the first structure includes a window cover device adapted to conceal the food display compartments and the counter from view by the passengers.

20. The galley system of claim 8, wherein at least one of the first end section and the second end section comprise at least one food display alcove for storing, securing and displaying food items accessible by the passengers as the passengers traverse the second aisle.

21. The galley system of claim 20, wherein the food display alcove comprises one of heated, refrigerated, and ambient temperature food display alcove.

22. The galley system of claim 1 further comprising a second set of doors for controlling access to the first aisle from a side of the galley system opposite the first set of doors.

23. The galley system of claim 1 wherein the second structure comprises a plurality of serving cart parking bins for storing and securing serving carts used by the crew members to serve food items to the passengers.

24. The galley system of claim 23, wherein the storage compartments are adapted for storing and securing food items and are accessible from the first aisle by the crew members.

25. The galley system of claim 24, wherein each of the storage compartments comprises one of heated, refrigerated, and ambient temperature storage compartment.

26. The galley system of claim 1, wherein the first set of doors are constructed of a sound absorbing material such that when the first set of doors are in the closed position, noise from the first aisle is generally prevented from being heard by the passengers.

27. An aircraft comprising:
a passenger compartment for transporting a plurality of passengers; and
multi-functional galley system comprising:
a passenger self-service food structure comprising a plurality of food display compartments extending through the self-service food structure such that the food display compartments are accessible from opposing sides of the self-service food structure, the food display compartments adapted to store, secure and display food items accessible by passengers;
a serving cart and supply storage structure comprising a plurality of serving cart parking bins and a plurality of storage compartments, the serving cart parking bins adapted to store and secure serving carts used by a crew member to serve food items to the passengers, the storage compartments adapted to store and secure food items;
a crew aisle between the passenger self-service food structure and the serving cart and supply storage structure; and
a cross aisle on an opposite side of the self-service food structure from the crew aisle, the cross aisle adapted to be traversed by passengers of the mobile platform as the passengers select and remove food items from the display compartments.

28. The aircraft of claim 27, wherein the multi-functional galley system further comprises at least one partition located on an opposite side of the second aisle from the passenger self-service food structure such that the cross aisle is formed between the passenger self-service food structure and the partition.

29. The aircraft of claim 27, wherein the multi-functional galley system further comprises a set of doors associated with the passenger self-service food structure and the serving cart and supply storage structure, the set of doors adapted to conceal the crew aisle from view of boarding passengers when the doors are in a closed position.

30. The aircraft of claim 27, wherein the passenger self-service food structure further comprises a plurality of storage compartments accessible from the crew aisle by a crew member, the storage compartments adapted to store and secure food items.

31. The aircraft of claim 27, wherein each food display compartment can be accessed from the crew aisle by a crew member and accessed from the cross aisle by a passenger.

32. The aircraft of claim 27, wherein each food display compartment comprises one of heated, refrigerated, and ambient temperature food display compartment.

33. The aircraft of claim 27, wherein the passenger self-service food structure further comprises a counter comprising at least one food bin for storing, securing and displaying food items accessible by passengers as the passengers traverse the cross aisle, wherein the food bin comprises one of heated, refrigerated, and ambient temperature food bin.

34. A method for serving food items to passengers of an aircraft, the method comprising;
providing a first group of passengers self-service access to food items stored, secured and displayed in a plurality of food display compartments that extend through a self-service structure included in a galley system such that the food display compartments are accessible from opposing sides of the self-service structure; and
serving a second group of passengers food items utilizing serving carts that are housed in a serving cart and supply storage structure included in the galley system when the serving carts are not in use.

35. The method of claim 34, wherein providing a first group of passengers self-service access comprises placing the food items in the display compartments from a crew aisle located between the self-service structure and the serving cart and supply storage structure so that the food items can be selected by the first group of passengers as the first group of passengers traverse a passenger cross aisle located on an opposing side of the self-service structure from the crew aisle.

36. The method of claim 35, wherein placing the food items comprises:
removing food items from a plurality of food item storage compartments included in the self-service structure, wherein the food item storage compartments are accessible from the crew aisle; and
placing the food items in one of the food display compartments such that the food item is accessible by the first group of passengers as the passenger traverses the cross aisle.

37. The method of claim 34, wherein the method further comprises concealing the crew aisle from view of boarding passengers by closing a set of doors attached to adjacent ends of the self-service food structure and the serving cart and supply storage structure.

38. The method of claim 34, wherein providing a first group of passengers access to food items displayed in the self-service food structure comprises:

serving food items from the self-service structure to passengers that have requested food items from a crew member standing in a passenger cross aisle located on an opposing side of the self-service structure from a crew aisle located between the self-service structure and the serving cart and supply storage structure.

39. The method of claim 34, wherein providing a first group of passengers access to food items displayed in the self-service food structure comprises displaying food items in at least one food bin included in a counter included in the self-service structure such that the food items can be selected by the first group of passengers as the passengers traverse a passenger cross aisle located on an opposing side of the self-service structure from a crew aisle located between the self-service structure and the serving cart and supply storage structure.

40. The method of claim 34, wherein serving a second group of passengers food items comprises:

removing a serving cart from one of a plurality of serving cart parking bins included in the serving cart and supply storage structure;

stocking the serving cart with food items removed from a plurality of food item storage compartments included in the serving cart and supply storage structure; and transporting the stocked serving cart to a location of at least one second group passenger such that the second group passenger can be served at least one food item.

41. The method of claim 34, wherein providing a first group of passengers access to food items displayed in the self-service food structure comprises:

providing a cross aisle located adjacent the self-service food structure, such that a passenger can approach the self-service food structure and view the displayed food items; and serving a food item to the passenger upon request by the passenger, wherein a crew member, positioned in a crew aisle located between the self-service food structure and the serving cart and supply storage structure, retrieves the requested food item from at least one of a plurality of storage compartments and serves the food item to the passenger.

42. An aircraft multi-functional galley system comprising:

a passenger self-service food structure comprising a plurality of food display compartments extending through the self-service food structure such that the food display compartments are accessible from opposing sides of the self-service food structure, the food display compartments adapted to store, secure and display food items accessible by passengers;

a serving cart and supply storage structure comprising a plurality of serving cart parking bins and a plurality of storage compartments, the serving cart parking bins adapted to store and secure serving carts used by a crew member to serve food items to the passengers, the storage compartments adapted to store and secure food items; and a crew aisle between the passenger self-service food structure and the serving cart and supply storage structure.

43. The aircraft galley system of claim 42 further comprising at least one partition located adjacent the passenger self-service food structure on a opposing side of the passenger self-service food structure from the crew aisle such that a cross aisle is formed between the passenger self-service food structure and the partition, which the passengers traverse while accessing at least one food item from the food display compartments.

44. The aircraft galley system of claim 43, wherein the passenger self-service food structure further comprises a tray storage compartment accessible from the cross aisle adapted to store, secure and display food item carrying trays accessible to the passengers as the passengers traverse the cross aisle.

45. The aircraft galley system of claim 43, wherein each food display compartment can be accessed from the crew aisle by a crew member and accessed from the cross aisle by a passenger.

46. The aircraft galley system of claim 42 further comprising a first set of doors associated with the passenger self-service food structure and the serving cart and supply storage structure, the first set of doors adapted to conceal the crew aisle from view by boarding passengers when the doors are in a closed position.

47. The aircraft galley system of claim 46 further comprising a second set of doors for controlling access to the crew aisle from a side of the galley system opposite the first set of doors.

48. The aircraft galley system of claim 42, wherein the passenger self-service food structure further comprises at least one supply cabinet formed in at least one end of the passenger self-service food structure for storing and securing supplies, the supply cabinet accessible from an outer side of the end of the passenger self-service food structure.

49. The aircraft galley system of claim 42, wherein the passenger self-service food structure further comprises a plurality of storage compartments accessible from the crew aisle, the storage compartments adapted to store and secure food items.

50. The aircraft galley system of claim 42, wherein each food display compartment comprises one of heated, refrigerated, and ambient temperature food display compartment.

51. The aircraft galley system of claim 43, wherein the passenger self-service food structure further comprises a counter accessible from the cross aisle, the counter comprising at least one food bin for storing, securing and displaying food items accessible by passengers, wherein the food bin comprises one of heated, refrigerated, and ambient temperature food bin.

52. The aircraft galley system of claim 46, wherein the first set of doors are constructed of a sound absorbing material such that when the first set of doors are in the closed position, noise from the crew aisle is generally prevented from being heard by the passengers.

* * * * *